3,266,989
TREATMENT OF ALCOHOLISM
Paul Francis O'Hollaren, Seattle, Wash., assignor to Enzomedic Laboratories, Inc., a corporation of Washington
No Drawing. Filed Nov. 13, 1962, Ser. No. 237,326
5 Claims. (Cl. 167—55)

This application is a continuation-in-part of my co-pending application Serial No. 92,756, filed March 2, 1961, now abandoned.

The present invention is concerned with the treatment of alcoholism and more particularly, it relates to a method and compositions for the treatment of humans afflicted with alcoholism which will alleviate the innate craving for more alcohol.

Alcoholism has been officially recognized as a disease by the American Medical Association and in the United States this disease ranks as the fourth most serious public health problem. There are nearly six million victims of this disease in the United States alone and this number is increasing annually at the rate of about 250,000 persons. It is estimated that one out of every sixteen persons who drink alcoholic beverages will eventually become an alcoholic. The disease is evenly distributed throughout the social drinkers of all levels of society, irrespective of gender, nationality or creed. Contrary to public opinion, only 7% of alcoholics end up on skid row. Less than 10% of all those afflicted with alcoholism are receiving therapy of any kind. Thus, there are almost five million Americans who are suffering and dying because they and their families are ashamed of their disease and ashamed to seek help. The shame arises principally from the general belief that alcoholism is a moral and character weakness. Such misconception and resulting stigma developed because both writers and scientists failed to differentiate between true alcoholism and drunkenness. The true alcoholic fights desperately for control and hates to become drunk. The habitual drunkard, in sharp contrast, enjoys the oblivion of drunkenness. It, therefore, becomes apparent that a method for treating alcoholics would directly alleviate the sufferings of millions of persons throughout the world and indirectly prevent the ruination of the lives, hopes and futures of countless others.

Since there is no generally accepted, clearcut definition of what constitutes alcoholism, it becomes necessary to define this term as it is intended to be used in the present application. In general, alcoholism as the term is employed herein signifies any form of alcoholic beverage drinking which goes beyond the traditional and customary "dietary" use of such beverages. Since there are mild and severe cases of alcoholism, the term can be better understood by classifying all who use alcohol as social drinkers or problem drinkers. Social drinkers tolerate alcohol well and develop no problem as a result of drinking alcohol except for an occasional "hangover." Problem drinkers, on the other hand, are those whose use of alcohol creates a problem with their health or in their moral, marital, occupational or social relationship.

Problem drinkers can be further classified as the true alcoholic and the escape drinker. The true alcoholic (sometimes referred to as the clinical alcoholic) suffers from an innate, constitutional intolerance to alcohol. In this type of drinker, the nerve cells are damaged from the very beginning of his social drinking. Eventually, the true alcoholic discovers that another drink will temporarily relieve his sick and miserable feeling. It is at this point that addiction to alcohol is born. Frequently, the toxic response on the part of the central nervous system will throw the patient into convulsions or delirium tremens.

The escape drinker exists as two distinct types—the alcoholic equivalent and the chronic inebriate. The alcoholic equivalent suffers from a mild personality or character disorder and frequently has a low resistance to stress or tension which leads him to turn to drinking for support. Frequently, this type of individual degenerates into true alcoholism.

The chronic inebriate suffers from gross emotional disturbances as well as personality and character defects. Thus, the oblivion of drunkenness is preferable to the sober state. Included in this group, but not necessarily limited thereto, are the psychopathic personalities, the grossly immature and inadequate individuals as well as the sexual and moral deviates.

In summary, the term "alcoholic" as employed herein is intended to encompass not only the various types of problem drinkers and escape drinkers but also the social drinker who ends up with an occasional "hangover" due to the excessive use of alcohol.

It is now well established that alcohol in any form such as beer, wine or whisky is a metabolic poison. In modest amounts, the body can readily metabolize alcohol to acetaldehyde which is further oxidized to acetic acid which in turn is metabolized to carbon dioxide and water and eliminated. However, when alcohol is consumed in excessive amounts or when a metabolic defect exists, acetaldehyde accumulates rapidly because of a relative metabolic block in the oxidative process. Since acetaldehyde is toxic, the eventual result of its accumulation in the body becomes apparent in such symptoms as nausea, irritability, sleeplessness, headache, tremor and craving for more alcohol. These symptoms are often referred to in the vernacular as "hangover."

It is one object of the present invention to provide compositions which can be readily and conveniently administered to a human host afflicted with alcoholism and which are highly effective in alleviating the craving for alcohol. Another object of this invention is to provide a method of administering the compositions disclosed herein which is simple and effective in relieving the insatiable craving for more alcohol so prevalent in alcoholics. Other objects will become apparent throughout the following specification and appended claims.

It has now been discovered that diphosphopyridine nucleotide (hereinafter referred to as DPN) is highly effective in combatting the craving for alcohol when administered to a human host intravenously or intramuscularly alone or in combination with any non-toxic, pharmaceutical, liquid carrier. DPN is a co-enzyme which can be isolated from fresh baker's yeast and which is commercially available as a white powder freely soluble in water. For this reason, DPN can be conveniently dissolved in aqueous, isotonic, saline solution and administered intravenously or intramuscularly to humans suffering from alcoholism.

In preparing compositions suitable for use in the present invention, DPN can be admixed with such liquid substances as water, vegetable oils, benzyl alcohol, propylene glycol, polyalkylene glycols or any other known liquid carrier for medicaments. Such compositions may be administered as solutions, suspensions or emulsions and if desired, they may contain other substances such as preserving agents, stabilizing agents, wetting or emulsifying agents as well as salts for varying the osmotic pressure or buffers.

Various dosages of the above compositions can be employed depending upon the route of administration. When the compositions are employed intramuscularly, it is preferred to inject 50 milligrams of DPN in normal saline solution three times daily. A solution of 300 milligrams of DPN dissolved in normal aqueous saline can likewise be injected intravenously at a rate of about 20 to 35 drops per minute. This dosage can be repeated once to four times daily depending upon the need of the patient.

The following examples illustrate the invention but are not to be construed as the only possible specific embodiments thereof since other minor variations will immediately become obvious to one skilled in the art upon a cursory reading of the same.

Example 1

A patient with a history of chronic alcoholism for many years was admitted to the hospital in a state of unconsciousness preceded by several days of continuous alcohol consumption. He was dismissed by his employer because of alcoholism. When the treatment with DPN was begun, he had been in the hospital for two weeks and had consumed no alcohol for several days but was very nervous, irritable and suffering from sleeplessness, only partially overcome by sedatives. In the morning of the day of treatment, the patient drank within five minutes 200 cc. of pure alcohol (equivalent to 14 one-ounce glasses of 100 proof whisky) in water after having fasted for 24 hours. After clinical evidence of intoxication and blood alcohol levels were at their peak, DPN 300 mg. dissolved in 100 cc. of 0.9% aqueous saline solution was started intravenously. At a rate of 50 drops (3 cc. or 9 mg. of DPN) per minute, pain in the back of the neck, paresthesias at the base of the tongue, dizziness and nausea occurred. Depending upon the rate of administration the patient's stage of intoxication by his own evaluation, by clinical response and by objective performance testing improved dramatically within two to three minutes of rapid DPN administration; after slowing the DPN, the patient returned gradually to his normal level of intoxication after a time lapse of two to four minutes. During a given experiment this was repeated several times, and the patient could be pulled in and out of intoxication at will.

This is demonstrated by the following table:

8:30 a.m.—200 cc. of alcohol in 400 cc. of water taken.
9:00 a.m.—About 50% intoxicated, face flushed, palms sweating, pupils dilated, blood alcohol 165 mg. percent.
9:30 a.m.—Considerably intoxicated, unable to walk without assistance: "Doctor, I am stiff—100% drunk." Blood alcohol 460 mg. percent. Unable to repeat more than two digits. Intravenous DPN started at maximum rate (120 drops/minute).
9:32 a.m.—Patient developed headache at base of neck—drip slowed to 50 drops/minute.
9:35 a.m.—"Doc, I am sobering up"—about 30% drunk. Speech clear. Can repeat all five digits.
9:40 a.m.—Hands steady, blood alcohol 250.5 mg. percent.
9:45 a.m.—Blood alcohol 272.5 mg. percent; DPN discontinued.
9:50 a.m.—"I am slipping"—about 50% intoxicated.
9:55 a.m.—Completely intoxicated, coarse shaking; tremor present.

Fifteen minutes later the same sequence of events could be reproduced. The table below shows the increase and decrease of the amount of alcohol in the patient's blood over a 12-hour time period.

| Time: | Blood alcohol, mg. percent |
|---|---|
| A.m.— | |
| 9:00 | 165 |
| 9:30 | 460 |
| 9:40 | 250.5 |
| 9:45 | 272.5 |
| 11:30 | 215.5 |
| P.m.— | |
| 12:30 | 176.0 |
| 5:45 | 151.0 |
| 7:45 | 85.5 |
| 9:45 | 15.0 |

In the late afternoon when the blood alcohol had almost disappeared, the patient did not have a hangover consisting of headache, nervousness and nausea as he expected after 13 ounces of whisky. He also did not have a craving for alcohol which he usually had during the withdrawal period. He slept all night, whereas previously he would have required more alcohol during the night in order to be able to sleep.

This experiment was repeated on three consecutive days with essentially the same results. When DPN was given simultaneously with the ingestion of alcohol, the effect on hangover and withdrawal symptoms was even more effective in that 200 mg. of DPN were as effective as 300 mg. Toxic effects on kidney or liver function that could be attributable to this treatment have not been found.

I claim:
1. A method for treating alcoholism to reduce the craving for alcohol which comprises internally administering to a patient clinically evidencing such symptoms of alcoholism a therapeutic composition containing diphosphopyridine nucleotide in an amount sufficient to reduce the craving for alcohol of such patient.
2. A method for treating alcoholism to reduce an alcoholic patient's craving for alcohol in accordance with claim 1, in which the therapeutic composition is administered to the patient intravenously.
3. A method for treating alcoholism to reduce an alcoholic patient's craving for alcohol in accordance with claim 1, in which the therapeutic composition is administered to the patient intramuscularly.
4. A method for treating alcoholism to reduce an alcoholic patient's craving for alcohol in accordance with claim 1, in which the therapeutic composition is administered to the patient intravenously and comprises a daily dosage of from 300 to 1000 milligrams of diphosphopyridine nucleotide dissolved in an aqueous, normal saline solution.
5. A method for treating alcoholism to reduce an alcoholic patient's craving for alcohol in accordance with claim 1, in which the therapeutic composition is administered to the patient intramuscularly and comprises a daily dosage of from 50 to 150 milligrams of diphosphopyridine nucleotide dissolved in an aqueous, normal saline solution.

References Cited by the Examiner

Canadian Pharmaceutical Journal, vol. 89, pages 8, 9 and 22.

Cecil, A Textbook of Medicine, Tenth edition, 1959, W. B. Saunders Co., Philadelphia, Pa., pages 1620 and 1621.

Jacobsen, Pharmacological Reviews, vol. 4, 1952, pages 123–127.

JULIAN S. LEVITT, *Primary Examiner.*

FRANK CACCIAPAGLIA, JR., *Examiner.*

SAM ROSEN, *Assistant Examiner.*